US008265809B2

(12) United States Patent
Webb (10) Patent No.: US 8,265,809 B2
(45) Date of Patent: Sep. 11, 2012

(54) AUTONOMOUS UNDERWATER VEHICLE WITH CURRENT MONITORING

(75) Inventor: Douglas C. Webb, Falmouth, MA (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 634 days.

(21) Appl. No.: 12/358,095

(22) Filed: Jan. 22, 2009

(65) Prior Publication Data

US 2010/0185348 A1    Jul. 22, 2010

(51) Int. Cl.
    *G01V 1/28*     (2006.01)
    *G01V 3/38*     (2006.01)
    *H02G 15/00*    (2006.01)

(52) U.S. Cl. ............. 701/21; 324/348; 702/12; 114/337

(58) Field of Classification Search ............... 701/21, 701/23; 367/17, 21, 16; 114/313, 337, 222, 114/274, 282, 312, 341, 342; 318/109; 104/138.1; 180/117; 244/3.15, 120; 324/337, 344, 347, 324/348, 345; 702/7, 12, 11

See application file for complete search history.

(56) References Cited

U.S. PATENT DOCUMENTS

| | | | |
|---|---|---|---|
| 4,089,218 A | 5/1978 | Cushing | |
| 5,291,847 A | 3/1994 | Webb | |
| 5,303,552 A | 4/1994 | Webb | |
| 5,390,548 A | 2/1995 | Kasper et al. | |
| 5,947,051 A * | 9/1999 | Geiger | 114/313 |
| 5,995,882 A | 11/1999 | Patterson et al. | |
| 6,807,856 B1 | 10/2004 | Webb | |
| 6,807,921 B2 * | 10/2004 | Huntsman | 114/312 |
| 7,096,814 B1 | 8/2006 | Webb | |
| 7,290,496 B2 | 11/2007 | Asfar et al. | |
| 7,789,723 B2 * | 9/2010 | Dane et al. | 440/6 |
| 7,984,684 B2 * | 7/2011 | Hinderks | 114/274 |
| 2002/0134294 A1 * | 9/2002 | Woodall et al. | 114/312 |
| 2004/0090195 A1 * | 5/2004 | Motsenbocker | 318/109 |
| 2007/0125289 A1 * | 6/2007 | Asfar et al. | 114/312 |
| 2007/0203623 A1 * | 8/2007 | Saunders et al. | 701/23 |
| 2008/0141921 A1 * | 6/2008 | Hinderks | 114/274 |
| 2010/0192799 A1 * | 8/2010 | Miller | 104/138.1 |
| 2010/0238762 A1 * | 9/2010 | Hornbostel | 367/17 |

OTHER PUBLICATIONS

Michael C. Gregg, The Study of Mixing in the Ocean: A Brief History, Oceanography, Apr. 1991, pp. 39-45.

* cited by examiner

*Primary Examiner* — Ronnie Mancho
(74) *Attorney, Agent, or Firm* — Foley & Lardner LLP (57) ABSTRACT

The present invention relates to an autonomous underwater vehicle ("AUV") for monitoring underwater fluid currents by detecting electrical currents induced by the flow of a conductive liquid through the Earth's magnetic field. More particularly, the present invention relates to the gathering of data related to underwater fluid currents and the control of AUV motion during data gathering.

19 Claims, 5 Drawing Sheets

AUTONOMOUS UNDERWATER VEHICLE WITH CURRENT MONITORING

CROSS-REFERENCE TO RELATED PATENT APPLICATIONS

1. Field of the Invention

The present invention relates to an autonomous underwater vehicle ("AUV") having control and circuitry for monitoring underwater fluid currents. More particularly, the present invention relates to the gathering of data related to underwater fluid currents and the control of AUV motion during data gathering.

2. Background of the Invention

Ocean water is a conductive fluid that moves within the magnetic field of the Earth. As such, an electric current is induced in the water as a result of its movement within the magnetic field. Furthermore, the ocean water does not move uniformly, but rather, moves in linear and non-linear horizontal and vertical fluid currents. By measuring the electrical current in the ocean at a given location, and monitoring changes in this electrical current relative to time and location, the magnitude and direction of fluid currents at a given location of the ocean can be measured. These measurements permit mapping of the velocity of ocean water currents, directions of water currents, and relative velocity of layers of ocean water. Additionally, the measurements provide data for a range of analyses which rely on numerous inputs including ocean water velocity.

SUMMARY OF THE INVENTION

One embodiment of the present invention provides for an underwater vehicle which can be operated within a body of electrically conductive water such as an ocean. The vehicle includes a hull and at least 2 electrodes in contact with the water to measure electrical characteristics of the water and generate information about the water currents in the body of water. The vehicle also includes a propulsion unit for moving the hull through a conductive liquid, and a control system coupled to the electrodes and propulsion unit. The control system is configured to monitor voltages at the electrodes, and to control the propulsion unit such that the electrodes are moved along a reciprocating course during voltage monitoring. The reciprocating course may include a vertical component. The control system may further store the electrode voltages, and transmit signals representative of the motion of the conductive liquid within which the hull resides to a location remote from the vessel. Depending upon the needs of a particular user, the transmitted signals may be representative of data which has had relatively little processing the control system (e.g. raw voltages associated with electrode measurements and vehicle locations) to highly processed data (e.g. actual water current velocity and direction associated with vehicle locations).

Another embodiment of the invention provides for a sealed vessel having a propulsion unit electrically controlled to move the vessel along a reciprocating course under the surface of the ocean. The vessel includes at least 2 electrodes for monitoring electrical characteristics of the water such as voltage. The electrodes and the propulsion unit are coupled to a controller which controls the propulsion unit, and generates data such as voltage data representative of voltages at the electrodes during motion of the vessel. The controller also generates location data representative of the location of the vessel during generation of the voltage data.

Another embodiment of the invention provides for a method for monitoring ocean currents. With this method, at least 2 electrodes are moved along a reciprocating course within the ocean. The reciprocating course may have a helical form. Along the path of the electrodes, voltage differences between the electrodes are determined at multiple locations along the path. Based upon these voltage differences, a velocity signal representative of the horizontal velocity of the ocean water is generated for selected locations along the path.

DETAILED DESCRIPTION OF THE PREFERRED EMBODIMENTS

Figure 1:
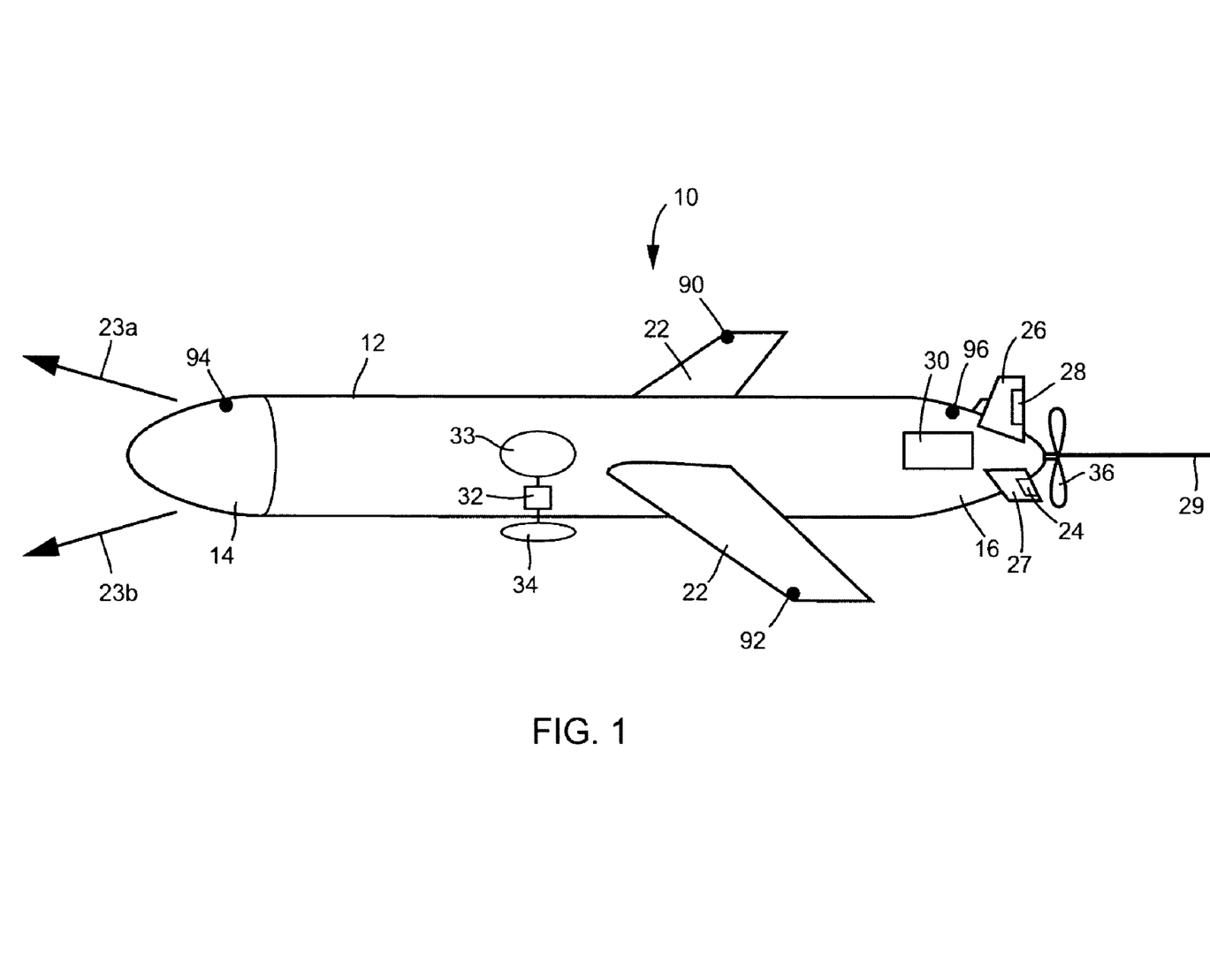
FIG. 1 is a perspective view of an AUV adapted to practice the present invention.

Referring to FIG. 1, an autonomous underwater vehicle ("AUV") adapted to practice the present invention is shown in perspective view. AUV 10 is a submersible vehicle configured to operate while suspended (e.g. buoyantly suspended) in a volume of liquid, shown as ocean 200. AUV 10 has a sealed hull 12 that is generally cylindrical in shape. Hull 12 may be configured as a pressure hull having a longitudinal axis. Hull 12 generally has a front end 14 and a rear end 16, and an exterior wall defining an interior cavity. The interior cavity of hull 12 houses batteries, electronics, controllers, and buoyancy controls. The batteries, electronics, controllers, and buoyancy controls are generally distributed within hull 12 so that AUV 10 has a center of mass that is below the center of buoyancy, thereby stabilizing the AUV in a vertical orientation when suspended in ocean 200. AUV 10 may optionally be provided with two wings 22 extending generally laterally from hull 12.

Hull 12 may be formed of a fiber reinforced composite matrix, as disclosed in U.S. Pat. No. 7,096,814, which is hereby incorporated by reference in its entirety. In another embodiment, hull 12 may be formed of an aluminum alloy, or another suitable material. AUV 10 is typically suitable for operation to a pressure of 200 bars, corresponding to an ocean depth of approximately 2,000 meters.

AUV 10 may be provided with stabilization and control fins at rear end 16. Fins may include a vertical stabilizer 26 having a rudder 28. Rudder 28 acts as a control surface, thereby providing yaw control of AUV 10. Rudder 28 may comprise some or all of the surface area of vertical stabilizer 26. Vertical stabilizer 26 is typically configured in a plane generally perpendicular to the plane of wings 22. Vertical stabilizer 26 may extend above or below hull 12. Fins may also include horizontal stabilizers 27. Horizontal stabilizers 27 are typically configured in a plane generally parallel to the plane of wings 22. AUV 10 may optionally be provided with an extension 29. Extension 29 may be a rigid extension, a semi-flexible extension, or a flexible cable.

A trim control may be used to control the pitch of AUV 10 in a horizontal, "nose up", or "nose down" orientation. In one embodiment, the trim of AUV 10 within ocean 200 is controlled by shifting an internal weight within hull 12 to move the center of mass of AUV 10 towards front end 14 or rear end 16. In another embodiment, AUV 10 may be provided with diving planes 24. Diving planes 24 act as a control surface, thereby providing hydrodynamic trim control of AUV 10. Diving planes 24 may comprise some or all of the surface area of horizontal stabilizers 27. If AUV 10 is equipped with diving planes 24, a second pair of diving planes may optionally be provided at front end 14 of AUV 10.

AUV 10 may be provided with a propulsion unit 30. In one embodiment, AUV 10 is a gliding underwater vehicle or a "glider" as disclosed in U.S. Pat. No. 5,291,847, which is hereby incorporated by reference in its entirety. Propulsion unit 30 may be an autonomous engine as disclosed in U.S. Pat. No. 5,291,847.

In another embodiment, propulsion unit 30 of AUV 10 may comprise a propeller 36 for propulsion within the ocean. Propeller 36 may be driven by a motor using any type of stored energy, such as electric batteries, compressed gasses, monopropellants, or the chemical reaction of or more two compounds. When provided with a propeller 36, AUV 10 is capable of horizontal movement within ocean 200, without an accompanying vertical displacement. Propeller 36 may be a conventional propeller extending from hull 12. In another embodiment, propeller 12 may be a ducted propeller. In still other embodiments, propulsion unit 30 may incorporate propulsion fins, sometimes referred to as a "fish tail" propulsion system.

AUV 10 may be provided with a hydrostatic buoyancy control to control depth within ocean 200, shown as pump 32. Pump 32 may be configured as a component of propulsion system 30, or it may be operated independently from a propulsion system. Pump 32 is coupled to an internal bladder 33 and an external bladder 34. Pump 32 may control the buoyancy of AUV 10 by pumping a control fluid such as mineral oil between internal bladder 33 and external bladder 34. Movement of the control fluid between internal bladder 33 and external bladder 34 changes the volume of the glider, thereby providing AUV 10 with positive or negative buoyancy. As AUV 10 ascends or descends within ocean 200, wings 22 permit AUV 10 to glide at a upward angle (arrow 23a, FIG. 1) or downward angle (arrow 23b, FIG. 1), thus permitting AUV 10 to change its horizontal position. In another embodiment, buoyancy control of AUV 10 may be provided by a ballast tank configured to be controllably emptied or filled with ocean water. The buoyancy control and trim control may also be combined by providing two ballast tanks, one positioned towards front end 14, and the other towards rear end 16. Trim control may be obtained by filling or emptying of the tanks to different levels, thereby altering the center of gravity of AUV 10.

In yet another embodiment, AUV 10 may be configured to be substantially neutrally buoyant. A neutrally buoyant AUV 10 may use propulsion system 30, rudder 28, and trim control 24 for hydrodynamic maneuvering within ocean 200, including control of depth within ocean 200.

AUV 10 is provided with one or more electrode pairs to measure a voltage gradient. In one embodiment, electrode pairs are silver/silver chloride electrodes. However, other types of reference electrodes known to the art may be used. In a typical embodiment, AUV 10 is provided with a first electrode 90 and a second electrode 92 forming a first pair of electrodes 102. First pair of electrodes 102 may be positioned substantially transverse to the longitudinal axis of AUV 10, thereby forming a pair of transverse electrodes 102. Pair of transverse electrodes 102 may be positioned on wings 22. Alternatively, pair of transverse electrodes 102 may be positioned on opposing sides of hull 12.

AUV 10 may be further provided with a third electrode 94 and a fourth electrode 96 forming a second pair of electrodes 104. Second pair of electrodes 104 may be positioned substantially parallel the longitudinal axis of AUV 10, thereby forming a pair of longitudinal electrodes 104. In one embodiment, both electrodes of pair of longitudinal electrodes 104 are placed on hull 12. In another embodiment, one or both electrodes of pair of longitudinal electrodes 104 may be towed behind AUV 10 on extension 29.

Figure 2:
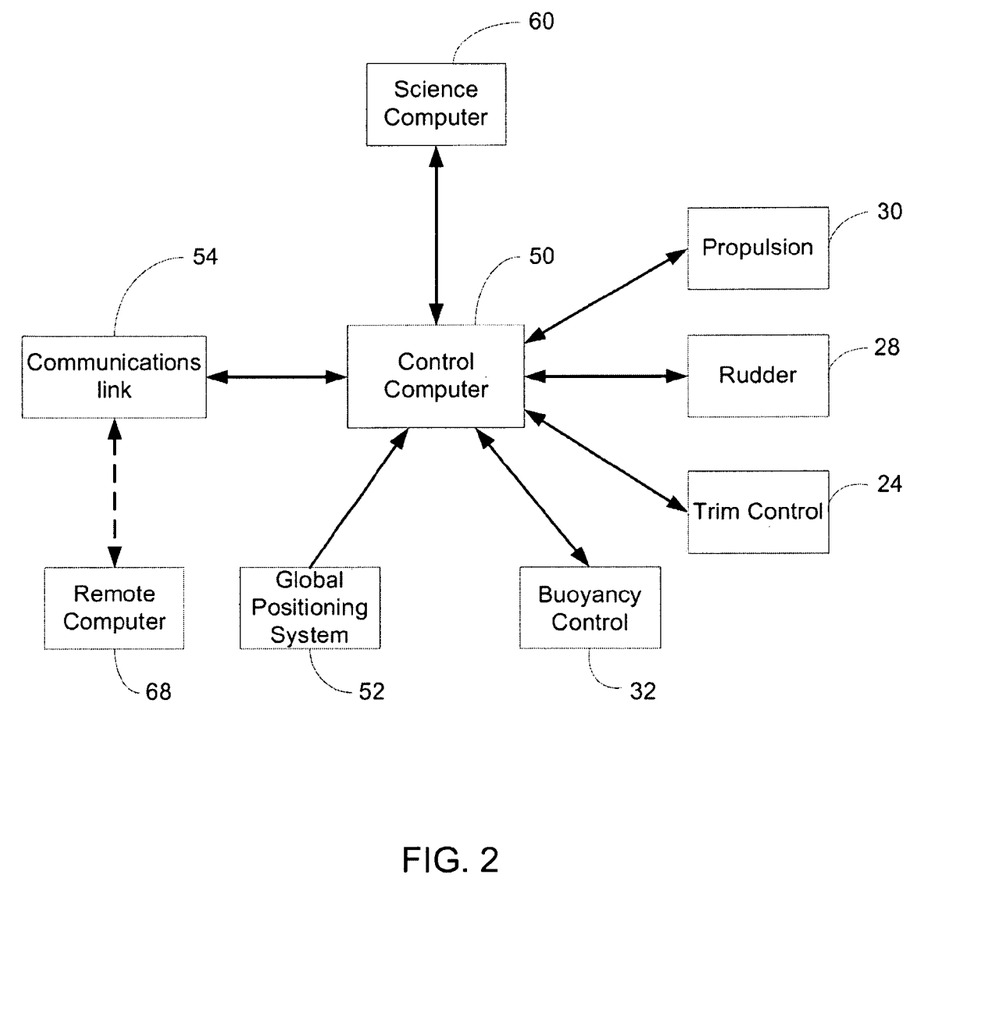
FIG. 2 is a block diagram of a vehicle control system of an AUV adapted to practice the present invention.

FIG. 2 is an illustrative block diagram depicting a control system for an AUV adapted to practice the present invention. AUV 10 is typically provided with a control computer 50. Control computer 50 may be a general-purpose computer having a processor and memory as is known in the art. The memory may include a hard disk drive or any type of solid state memory. Control computer 50 is communicatively coupled to propulsion unit 30, trim control 24, rudder 28, and buoyancy control 32, thereby providing three-dimensional directional control of AUV 10 within ocean 200. Control computer 50 may thereby direct AUV 10 on one or more reciprocating courses of the present invention. Alternatively, control computer 50 may direct AUV 10 on a non-reciprocating course to change geographical position within ocean 200.

Control computer 50 is additionally communicatively coupled to a navigational receiver 52. In a typical embodiment, navigational receiver 52 is a Global Positioning System ("GPS") receiver. Alternatively, receiver 52 may be a LORAN receiver or an acoustic receiver. In another embodiment, receiver 52 may include an inertial navigation system. Control computer 50 may thereby receive geographical location information from receiver 52 to determine the location of AUV 10. Control computer 50 may additionally be communicatively coupled to a science computer 60.

Control computer 50 and science computer 60 may also be communicatively coupled to one or more communications links 54. Communications link 54 may be used to establish a data connection between AUV 10 and a remote computer 68. Remote computer 68 may be on land, underwater, on a buoy or a ship, or on another object submerged within ocean 200. In a typical embodiment, communications link 54 is a satellite transceiver capable of establishing a two-way data link with remote computer 68 using the Iridium satellite constellation. Communications link 54 may also be another type of wireless data link. Alternatively, communications link 54 may be a wired data connection capable of use when AUV 10 is removed from ocean 200. In other embodiments, communications link 54 may be an optical data link or an acoustic data link.

Communications link 54 may be used to transmit scientific data and AUV status information to remote computer 68. In a typical embodiment, partially processed data scientific data is periodically transmitted to remote computer 68 using a wireless communications link while AUV 10 is deployed in the ocean, and science computer 60 additionally stores unprocessed data to be downloaded from AUV 10 when the AUV is physically retrieved. Additionally, communications link 54 may be used to provide control computer 50 or science computer 60 with new data collection instructions, navigational information, software updates, or any other programming change.

Figure 3:
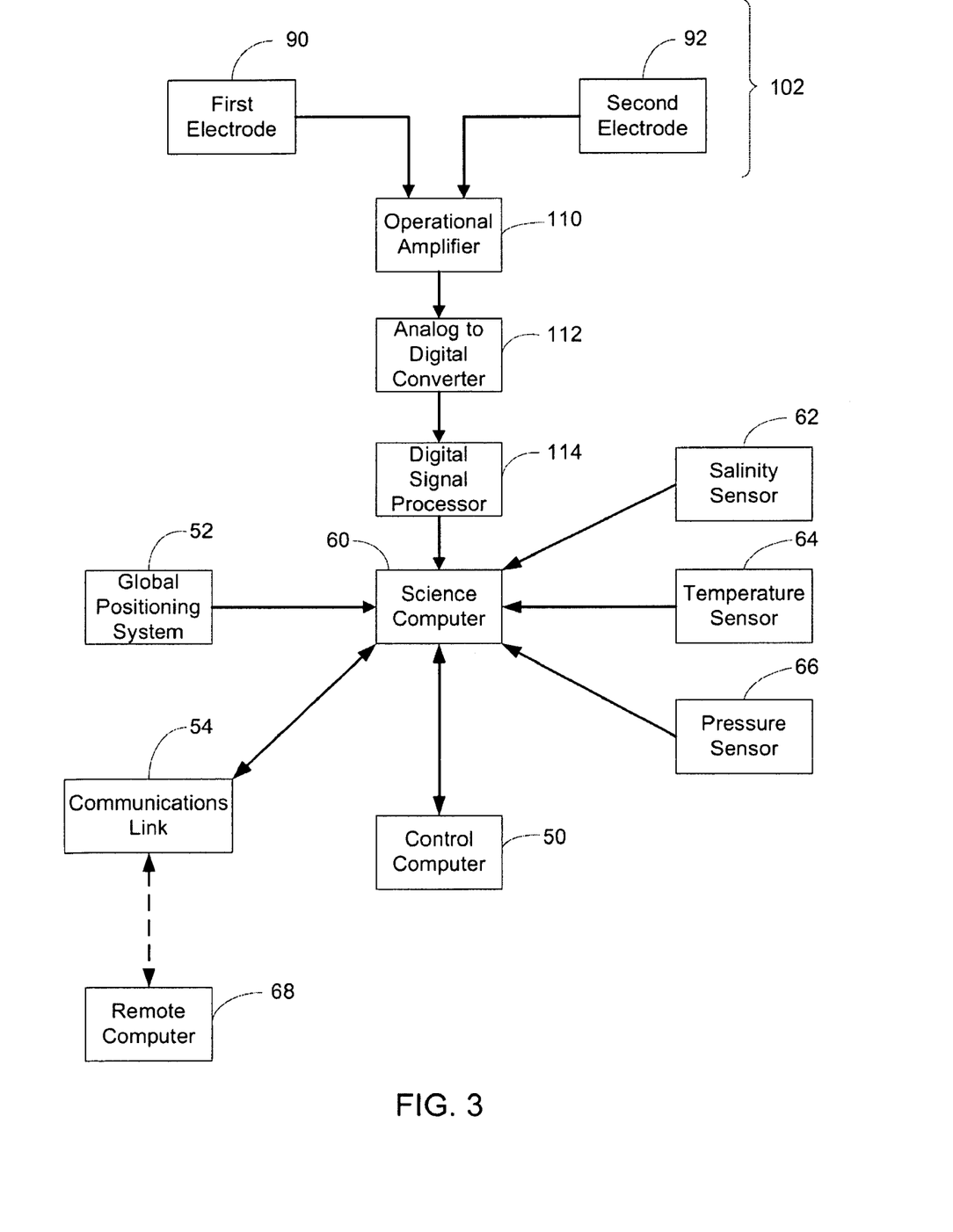
FIG. 3 is a block diagram of a scientific data collection system of an AUV adapted to practice the present invention.

FIG. 3 is an illustrative block diagram depicting a data collection system for an AUV adapted to practice the present invention. In a typical embodiment, AUV 10 is provided with a science computer 60. Science computer 60 may be a general-purpose computer having a processor and memory as is known in the art. The memory may include a hard disk drive or any type of solid state memory. In a typical embodiment, science computer 60 is communicatively coupled to control computer 50. In another embodiment, a single computational device performs the functions of both control computer 50 and science computer 60.

Science computer 60 may be programmed to provide navigational requests to control computer 50. Navigational requests may include instructions to direct AUV 10 on a reciprocating course at the a location of AUV 10 for data collection purposes. Additionally, navigational requests may include instructions to direct AUV 10 to a location within ocean 200 that is remote from the present location of AUV 10.

Still referring to FIG. 3, a voltage signal generated by an electrode pair, shown as first electrode 90 and second electrode 92, forming first pair of electrodes 102, is received by operational amplifier 110 and amplified. Operational amplifier 110 is coupled to an analog to digital converter 112. In one embodiment, A/D converter 112 is a 16-bit converter. A digital signal processor 114 may be coupled between A/D converter 112 and science computer 60. Alternatively, A/D converter 112 may be coupled directly to science computer 60. The amplified voltage signal is thereby converted to a digital signal, optionally processed, and communicated to science computer 60. Science computer 60 thereby receives and stores in a memory (not shown) data representing the voltage detected at first electrode pair 102. Science computer 60 is typically coupled to additional scientific instruments, which generally include a salinity sensor 62, a temperature sensor 64, and a pressure sensor 66. Science computer 60 is typically configured to thereby receive and store scientific data corresponding to ocean water current velocity, salinity, temperature, pressure, and position within ocean 200. Other configurations for a scientific data collection system will be readily apparent to those skilled in the art.

Science computer may also be communicatively coupled to navigational receiver 52. Science computer 60 may thereby receive geographical location information from receiver 52 to determine the location of AUV 10. Science computer may request control computer 50 to direct AUV 10 to a remote point in ocean 200 as required for scientific data collection or for other purposes, such as instrument retrieval upon the completion of data collection. Science computer 60 may be programmed to collect scientific data along a predefined path within ocean 200. Alternatively, science computer 60 may be programmed to autonomously collect scientific data within a volume of ocean 200 delineated by positional geographic boundaries. In another embodiment, science computer 60 may be provided with one of more way points within ocean 200, and directed to collect scientific data while traveling on an autonomously-determined path between the way points. During travel within ocean 200, science computer 60 may collect and store in memory scientific data from none, some, or all of the scientific instruments and navigational receiver 52 carried by AUV 10.

Figure 4:
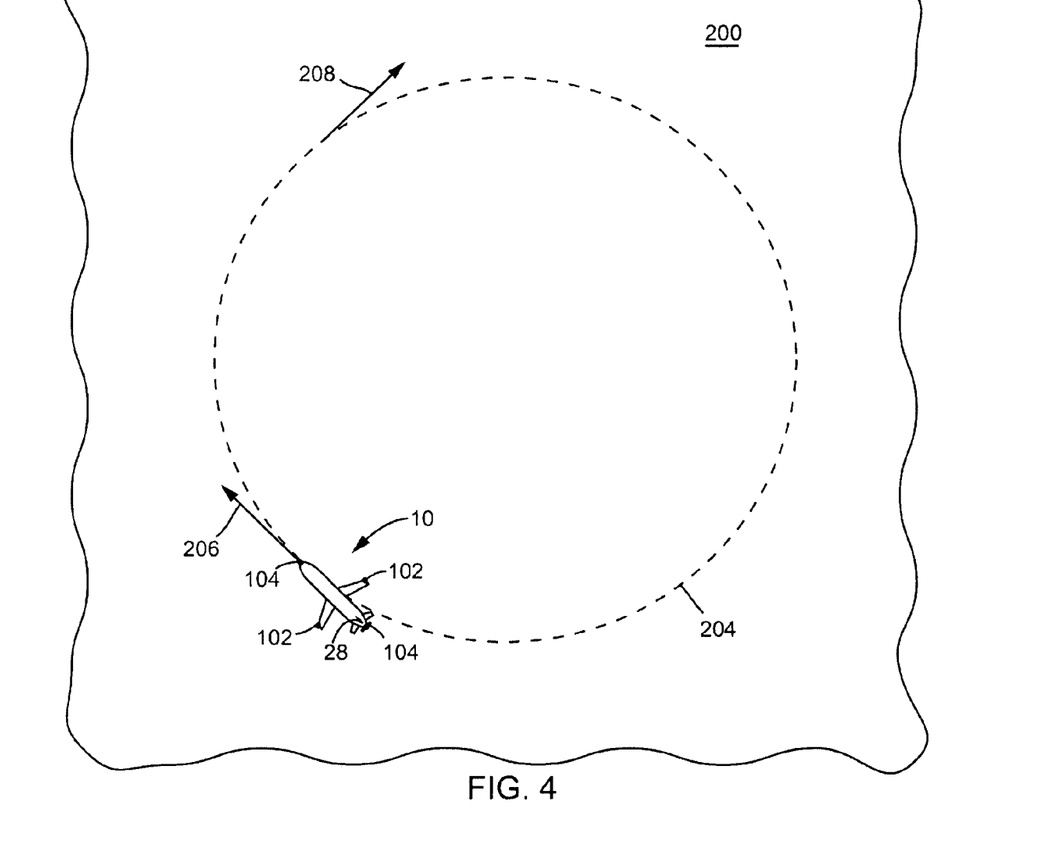
FIG. 4 is a plan view of a reciprocating course embodying the present invention.

Referring to FIG. 4, an AUV 10 having pair of transverse electrodes 102 and pair of longitudinal electrodes 104 is shown in plan view. When a conductor moves within a magnetic field, a voltage gradient is generated. Ocean water is a conductor that is moved through the Earth's magnetic field by ocean currents. The movement of ocean water thus creates a voltage gradient between two separated points, which is a function of the velocity of the ocean water through the Earth's magnetic field. Additionally, water at various depths may be moving at different velocities, a phenomena known as current shear. Thus, the difference in the voltage gradient between two depths is representative of the current shear.

Current shear data may be used to calculate ocean current velocities with respect to a frame of reference that is fixed with respect to the surface of the Earth. To determine ocean current velocities, the velocity of AUV 10 in the fixed reference frame must be determined at the surface of the ocean or at one or more depths. Where there is a known value for the current shear between a first depth with a known ocean current velocity and a second depth with an unknown current velocity, the ocean current velocity at the second depth may be determined by summing the vectors representing the current velocity at the first depth and the current shear.

In one embodiment, the velocity of AUV 10 with respect to the surface of the Earth may be obtained through closely spaced location readings from navigational receiver 52. In another embodiment, AUV 10 periodically receives geographical location information using receiver 52 while at or near the ocean surface. Typically, the starting position of AUV 10 prior to data collection using a reciprocating course will be displaced from the ending position. This change in geographical location may be represented as a first vector having a distance and heading. Additionally, AUV 10 may be programmed to collect and store data representative of propelled motion within ocean 200 with respect to an internal frame of reference, which may be represented as a second vector having a distance and direction. The second vector may be subtracted from the first vector to produce a vector representative of the current-induced motion of AUV 10 during data collection, and compared to the sum of individual current shear velocities.

An AUV 10 adapted to practice the present invention collects a series of voltage signals representative of the current shear at a range of depths in the following manner. The voltage gradient induced by moving ocean water at a location may be measured by one or more electrode pairs. The voltage gradient induced by moving ocean water is perpendicular to the plane defined by the B field vector of the Earth's magnetic field and the vector direction of ocean water flow. It is understood that if the B field vector and ocean water flow vector are parallel, no voltage gradient is generated by the movement of ocean water. For purposes of the present invention, the field strength of the Earth's magnetic field may be considered locally invariant where movement of AUV 10 is typically localized within horizontal distances on the order of ten kilometers.

Movement of AUV 10 through the Earth's magnetic field also induces a voltage gradient in wires connecting an electrode pair. Linear movement of AUV 10 through the vertical component of the B field vector at a constant velocity will induce a constant voltage in electrode pairs mounted on the AUV. Metallic electrodes placed into a conductive liquid further act as an electrochemical cell, generating a voltage potential. The electrode cell potential is also generally invariant during the measurement process.

Controller 50 directs AUV 10 on a reciprocating course, shown as a generally circular reciprocating course 204, by steering the AUV in a course having changes in horizontal heading. Generally, a reciprocating course comprises both forward motion of AUV 10 and at least a 180 degree change in horizontal heading. Preferably, a reciprocating course comprises both forward motion of AUV 10 and a 360 degree change in horizontal heading, wherein the AUV completes a full rotation in a horizontal plane. When AUV is directed on a reciprocating course at a constant depth, a reciprocating course may be a closed course such as a circle, oval, or another two-dimensional shape. A closed reciprocating course may also be closed in three dimensions, that is, the AUV returns to a starting point after changes in both heading and depth. Alternatively, a reciprocating course may be an open course when viewed in either two or three dimensions.

An open reciprocating course may be a portion of a circular path, a U shape, a spiral, a helix or corkscrew shape, or any other open shape. The reciprocating courses of the present invention may be any path length and shape providing reciprocating AUV movement sufficient to collect data representative of ocean current velocities.

Still referring to FIG. 4, AUV 10 is buoyantly suspended in ocean water 200, wherein ocean water 200 has a horizontal water current in an arbitrary direction, shown as first direction 206. AUV 10 is propelled at a constant forward velocity on a reciprocating course 204. A generally circular reciprocating course is obtained by propelling AUV 10 at a constant forward velocity and at a constant depth while maintaining a constant rudder angle at rudder 28. It is understood that such a generally circular reciprocating course is defined from a frame of reference internal to AUV 10. When AUV 10 is directed in a circular reciprocating course while being advected by a horizontal ocean current, the reciprocating course will be cycloidal when viewed from a frame of reference that is fixed relative to the ocean floor or another fixed geographical location.

As AUV 10 follows reciprocating course 204, AUV 10 is continuously advected in first direction 206 by the ocean water current. During horizontal movement wherein the longitudinal axis of AUV 10 is oriented parallel to first direction 206, a voltage is detected by pair of transverse electrodes 102. The voltage detected at pair of transverse electrodes 102 comprises a voltage representative of ocean water movement, or ocean movement component, induced by movement of ocean water 200 in first direction 206. However, the voltage detected at pair of longitudinal electrodes 104 does not comprise an ocean movement component, as pair of longitudinal electrodes 104 is parallel to the direction of the ocean water current.

When AUV 10 is oriented such that the AUV longitudinal axis is oriented parallel to a second direction 208 and perpendicular to first direction 206, a voltage is detected by pair of longitudinal electrodes 104. The voltage detected at pair of longitudinal electrodes 104 comprises an ocean movement component, induced by movement of ocean water 200 in first direction 206. However, the voltage detected at pair of transverse electrodes 102 does not comprise an ocean movement component, as pair of transverse electrodes 102 is parallel to the direction of the ocean water current.

As AUV 10 is oriented in and moves in a direction 180 degrees opposite to first direction 206, the voltage detected at pair of transverse electrodes 102 comprises an ocean movement component that is of the same magnitude, but opposite in sign to the ocean movement voltage detected during travel in first direction 206. Similarly, as AUV 10 is oriented in and moves in a direction 180 degrees opposite to second direction 208, the voltage detected at pair of longitudinal electrodes 104 comprises an ocean movement component that is of the same magnitude, but opposite in sign to the ocean movement voltage detected during travel in second direction 208.

Because the voltage signal induced by ocean movement changes sign when AUV 10 is directed on opposite headings within a reciprocating course, the locally invariant voltages generated by motion of AUV 10 and the electrode cell potential may be subtracted from the voltage signal detected by one or more electrodes pairs of AUV 10. Accordingly, the reciprocating courses of the present invention enable separation of the signal representing the voltage induced by ocean water moving through the Earth's magnetic field from the voltages generated by forward motion of the AUV through the Earth's magnetic field and the electrode cell potential.

As AUV 10 changes depth within ocean 200, voltage signals representative of the relative ocean water current shear between depths may be collected. Where AUV 10 achieves propulsion through buoyancy control, AUV 10 simultaneously changes vertical depth and horizontal position within ocean 200. Accordingly, the voltage signals representative of ocean water currents may be grouped into depth ranges to determine average ocean water current velocities within stratified depth levels. Where AUV is fitted with a propeller or another propulsion system allowing horizontal travel, AUV 10 may collect data, including voltage signals representative of ocean water current velocity, at one or more substantially constant depths.

Referring to FIG. 5, a variety of reciprocating courses embodying the present invention are shown in perspective views. The paths of AUV 10 are shown with respect to an internal frame of reference, rather than in reference to a fixed point on the ocean floor. It is understood that AUV 10 may be advected by ocean currents, thereby causing deviations from the depicted courses when viewed in a frame of reference external to AUV 10, i.e. with respect to a fixed point on the ocean floor. AUV 10 is generally disposed in ocean water 200 beneath the ocean surface 202.

Figure 5A:
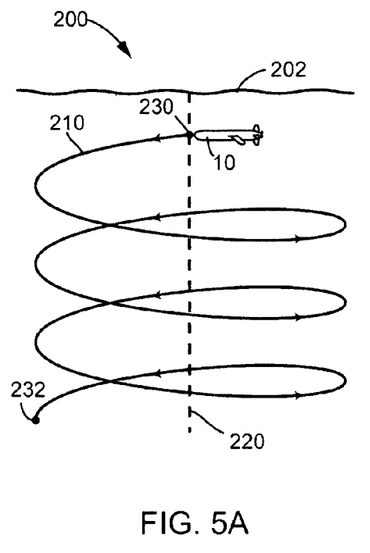
FIG. 5 is a perspective view of reciprocating courses embodying the present invention.

FIG. 5A shows a helical path 210 of AUV 10 about a vertical axis 220 perpendicular to ocean surface 202. According to this embodiment, AUV 10 continuously changes depth while moving forward at a substantially constant velocity between a starting point 230 and an ending point 232. As AUV 10 does not remain at a constant depth during data collection, voltage readings for a range of depths may be averaged together as AUV 10 changes heading. A helical path may be an open reciprocating course. Alternatively, AUV 10 may be further directed on a return reciprocating path to starting point 230.

Figure 5B:
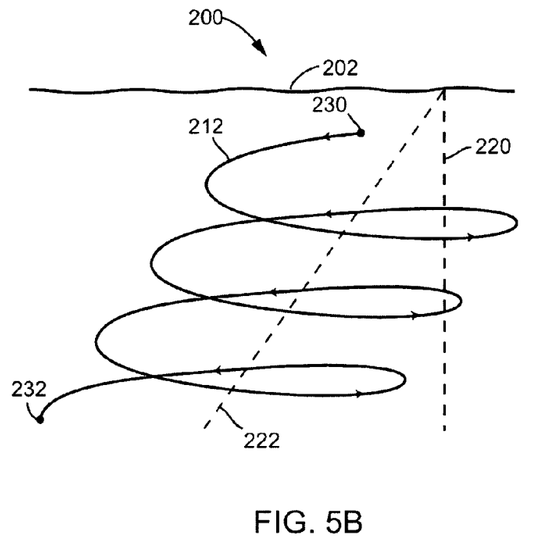

FIG. 5B shows a skewed helical path 212 about an axis 222 that is skewed with respect to vertical axis 220. According to this embodiment, AUV 10 continuously changes depth while moving forward at a substantially constant velocity between starting point 230 and ending point 232. As AUV 10 does not remain at a constant depth during data collection, voltage readings for a range of depths may be averaged together as AUV 10 changes heading. A skewed helical path may be an open reciprocating course. Alternatively, AUV 10 may be further directed on a return reciprocating path.

Figure 5C:
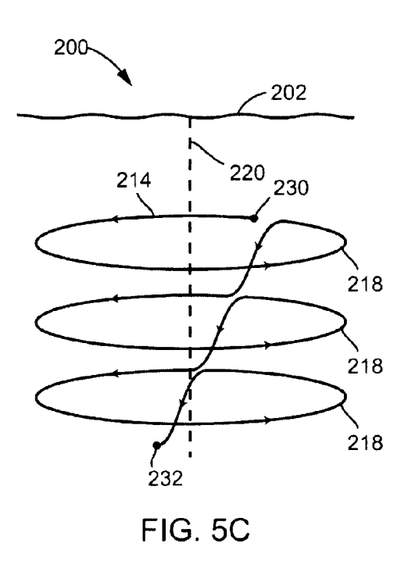

FIG. 5C shows a discrete-depth reciprocating course 214, comprising a set of circular reciprocating segments 218 each at a substantially constant depth, wherein each segment 218 is circular about a vertical axis 220 perpendicular to ocean surface 202. Reciprocating course 214 is shown as an open course having starting point 230 and ending point 232. According to this embodiment, AUV 10 may be programmed to collect ocean current data at predetermined discrete depths, or AUV 10 may autonomously select certain discrete depths for reciprocating courses upon detection of variations in horizontal current velocities. Once a circular reciprocating course segment 218 is completed at a substantially constant depth, AUV 10 is directed to a new depth. At each discrete depth, AUV 10 is directed in a reciprocating circular course segment 218.

Figure 5D:
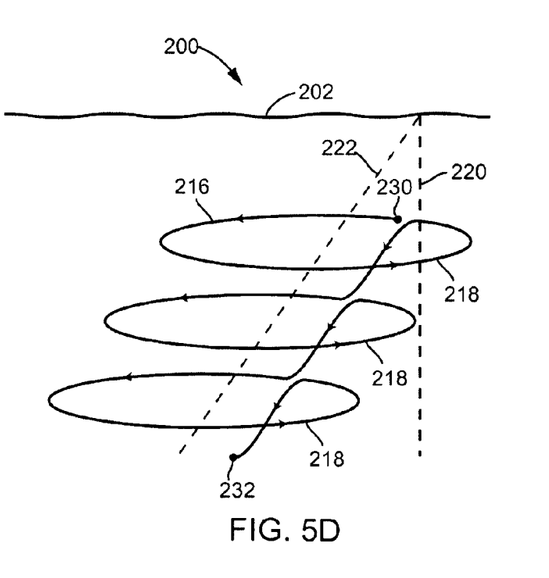

FIG. 5D shows a discrete-depth reciprocating course 216, comprising a set of circular reciprocating segments 218 each at a substantially constant depth, wherein each segment 218 is circular about an axis 222 that is skewed with respect to vertical axis 220. Reciprocating course 216 is shown as an open course having starting point 230 and ending point 232. According to this embodiment, AUV 10 may be programmed to collect ocean current data at predetermined discrete depths,

What is claimed is:

1. An apparatus comprising:
a sealed hull having at least first and second electrodes;
a propulsion unit for moving the hull through a conductive liquid while the hull is submerged under a surface of the conductive liquid; and
a control system coupled to the electrodes and configured to
monitor voltages at the electrodes, wherein the voltages are the result of the motion of the conductive liquid with respect to the magnetic field of the Earth;
control the propulsion unit such that the electrodes are moved along a reciprocating course during voltage monitoring, wherein the reciprocating course includes at least a one hundred eighty degree change in horizontal heading and a plurality of depths in the conductive liquid; and
wirelessly transmit signals representative of the motion of the conductive liquid, relative to a frame of reference that is fixed with respect to the surface of the Earth, within which the hull resides to a location remote from the hull while the hull is on the surface of the conductive liquid, wherein the control system is further configured to remove from the signals portions representative of the voltage generated by motion of the apparatus with respect to the magnetic field of the Earth and the voltage of the electrodes in a conductive liquid.

2. The apparatus of claim 1, wherein the control system controls the propulsion unit so that the hull moves along a reciprocating course having a vertical component.

3. The apparatus of claim 2, wherein the reciprocating course has a helical form.

4. The apparatus of claim 1, wherein the control system controls the propulsion unit so that the hull moves at a substantially constant speed.

5. The apparatus of claim 1, wherein the control system acquires data representative of the speed of the hull.

6. The apparatus of claim 5, wherein the control system acquires data representative of the orientation of the hull.

7. The apparatus of claim 1, wherein the propulsion unit includes at least one propeller.

8. The apparatus of claim 1, wherein the propulsion unit includes a buoyancy control to cause motion of the hull in response to changes in the buoyancy of the hull, and control surfaces being operable by the control system to control the direction of the hull while in motion.

9. An apparatus comprising:
a sealed vessel for moving under the surface of the ocean;
at least two electrodes in communication with the ocean;
a controller located within the vessel and coupled to the at least two electrodes, wherein the controller is configured to:
generate voltage data representative of voltages at the electrodes during motion of the vessel, wherein the voltages are the result of the motion of the ocean water with respect to the magnetic field of the Earth, and wherein the controller is further configured to remove from the voltage data portions representative of the voltage generated by motion of the apparatus with respect to the magnetic field of the Earth and the voltage of the electrodes in the ocean;
generate location data representative of the location of the vessel during generation of the voltage data;
generate motion data representative of the motion of the ocean water at locations represented by the location data, wherein the motion of the ocean water is referenced to the surface of the Earth; and
store the voltage data and location data in a memory; and
a propulsion unit coupled to the sealed vessel and electrically controlled by the controller to move the vessel along a reciprocating course under the surface of the ocean, wherein the reciprocating course includes at least a one hundred eighty degree change in horizontal heading and a plurality of depths in the ocean.

10. The apparatus of claim 9, wherein the controller is configured to transmit data representative of the voltage at the electrodes and location data to a location displaced from the vessel.

11. The apparatus of claim 9, wherein the propulsion unit includes at least one propeller.

12. The apparatus of claim 9, wherein the propulsion unit includes a buoyancy control to cause motion of the hull in response to changes in the buoyancy of the hull, and one or more control surfaces operable by the controller to control the direction of the hull while in motion.

13. The apparatus of claim 9, wherein the reciprocating course has a helical form.

14. A method for monitoring ocean currents, comprising:
moving a sealed vessel that includes at least 2 electrodes along a reciprocating course under a surface of the ocean, wherein the reciprocating course includes at least a one hundred eighty degree change in horizontal heading and a plurality of depths in the ocean;
determining a first voltage difference between the electrodes at a first location along the course;
determining a second voltage difference between the electrodes at a second location along the course, wherein the first voltage difference and the second voltage difference are the result of the motion of the ocean water relative to the magnetic field of the Earth; and
generating a velocity signal representative of the horizontal velocity of the ocean water, with respect to a frame of reference that is fixed with respect to the surface of the Earth, at the second location, wherein portions of the velocity signal that are representative of the voltage generated by motion of the apparatus with respect to the magnetic field of the Earth and the voltage of the electrodes in the ocean are removed.

15. The method of claim 14, wherein the method of claim 14 is repeated to generate a plurality of velocity signals representative of the horizontal velocity of ocean water at a plurality of ocean depths.

16. The method of claim 15, further comprising the step of storing the velocity signals in a memory.

17. The method of claim 16, further comprising the step of transmitting the velocity signals to a location displaced from the locations within the ocean at which the signals were generated.

18. The method of claim 15, further comprising the step of generating a visual representation of the current distribution within an area of the ocean based upon the velocity signals.

19. The method of claim 14, wherein the reciprocating course has a helical form.

* * * * *